D. M. ROBERTSON.
SCREW GRIPE.
No. 45,524. Patented Dec. 20, 1864.
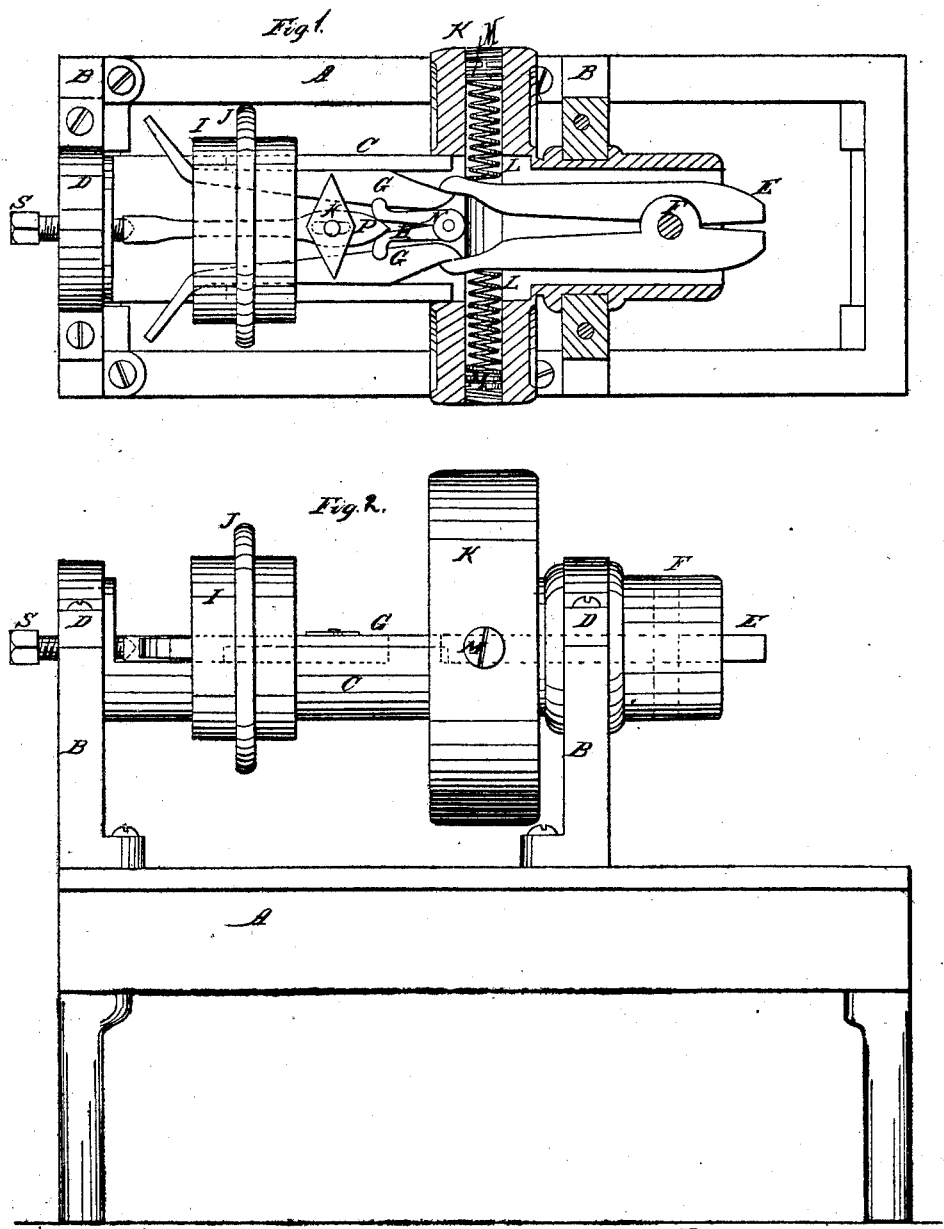

UNITED STATES PATENT OFFICE.

DANIEL M. ROBERTSON, OF MANCHESTER, NEW HAMPSHIRE.

IMPROVED SCREW-GRIP.

Specification forming part of Letters Patent No. 45,524, dated December 20, 1864; antedated December 9, 1864.

*To all whom it may concern:*

Be it known that I, DANIEL M. ROBERTSON, of Manchester, in the county of Hillsborough and State of New Hampshire, have invented certain new and useful Improvements in Machines for Gripping Screw-Blanks and other Small Articles; and I do hereby declare that the same is described and represented in the following specification and drawings.

To enable others skilled in the art to make and use my improvements, I will proceed to describe their construction and operation, referring to the drawings, in which the same letters indicate like parts in each of the figures.

Figure 1 is a plan or top view of a machine with my improvements. Some of the parts are shown in section to show other parts clearly. Fig. 2 is a side elevation of the same.

The nature of my invention and improvements in machines for gripping screws and other articles consists in the arrangement of some levers to close the gripping-jaws, which levers are operated by a traversing collar to close the jaws while the machine is in motion; also, in providing the levers which close the jaws with an adjustable fulcrum, so as to close the jaws more or less, to suit the size of the article being gripped.

In the accompanying drawings, A is a strong frame, to which the stocks B B are fastened to form boxes and support the mandrel C, which is fitted to turn in the stocks and is secured by the caps D D. A portion of the mandrel C between the stocks is made in two parts and divided longitudinally in the center, with an open space between for the devices which operate the gripping-jaws E, which hold the screw-blank or other article placed between them. These jaws E extend a short distance beyond the end of the mandrel, and are hinged together on the pin F, which passes through the mandrel for that purpose.

The jaws E are made in the form shown in Fig. 1, and their rear ends are pressed apart so as to close the jaws by the levers G G, which are made in the form shown, and vibrate on the ends of the arms H. (Shown in the drawings.) The rear ends of the levers G are turned out to form inclined planes for the traversing collar I to act on, which collar is traversed by a forked lever arranged to act on the flange J of the collar.

K is a pulley for the band to turn the mandrel, and is firmly fastened to the mandrel. This pulley is perforated entirely through radially, as shown in Fig. 1, and some spiral springs, L L, are placed in the perforation, which act on the rear ends of the jaws E, to press open the front ends when the collar I is moved off of the inclined ends of the levers G. The springs L may be adjusted by the screws M M, which are fitted to the outer ends of the perforation through the pulley K.

In order to close the jaws E more or less to hold screws or articles of different sizes, I have made levers G G to vibrate on the ends of the arms H, which form an adjustable fulcrum for the levers. These arms H are made in the form shown and hinged on the pin N in the mandrel, so as to vibrate, and are pressed apart by the wedge P to vary the fulcra of the levers G and adjust them, so that they will close the jaws to suit the size of the article to be held. The wedge P is made in the form shown, and has a slot in it for the pin R, on which it traverses, and it is forced forward between the arms H by the screw S in the end of the mandrel, the end of the wedge being perforated for the point of the screw. As the collar I is traversed by the flange J, the jaws may be closed so as to grip the article turned without stopping the mandrel, and after it is turned it may be released and another put in its place while the mandrel is in motion.

I believe I have described and represented my improvements in machines for gripping screws and other articles so as to enable any person skilled in the art to make and use them.

I will now state what I desire to secure by Letters Patent, to wit:

1. The levers G G, in combination with the jaws E and traversing collar I, for the purpose of gripping the article placed in the jaws.

2. Providing the levers G G with an adjustable fulcrum, for the purposes specified.

DANIEL M. ROBERTSON.

Witnesses:
E. N. HARRINGTON,
JAMES O. ADAMS.